United States Patent
Fujii

(10) Patent No.: US 11,597,090 B2
(45) Date of Patent: Mar. 7, 2023

(54) INTERFERENCE DETERMINATION DEVICE AND METHOD

(71) Applicant: OMRON Corporation, Kyoto (JP)

(72) Inventor: Haruka Fujii, Kyotanabe (JP)

(73) Assignee: Omron Corporation, Kyoto (JP)

( * ) Notice: Subject to any disclaimer, the term of this patent is extended or adjusted under 35 U.S.C. 154(b) by 182 days.

(21) Appl. No.: 17/193,560

(22) Filed: Mar. 5, 2021

(65) Prior Publication Data

US 2021/0283775 A1 Sep. 16, 2021

(30) Foreign Application Priority Data

Mar. 13, 2020 (JP) .............................. JP2020-044762

(51) Int. Cl.
 *B25J 9/16* (2006.01)
 *G05B 19/4061* (2006.01)
 *B25J 9/00* (2006.01)

(52) U.S. Cl.
 CPC .......... *B25J 9/1666* (2013.01); *B25J 9/0084* (2013.01); *B25J 9/1676* (2013.01); *G05B 19/4061* (2013.01); *G05B 2219/39083* (2013.01)

(58) Field of Classification Search
 CPC ...... B25J 9/1666; B25J 9/0084; B25J 9/1676; B25J 9/1682; B25J 9/16; B25J 9/1656; G05B 19/4061; G05B 2219/39083
 See application file for complete search history.

(56) References Cited

U.S. PATENT DOCUMENTS 10,481,571 B2 * 11/2019 Matsushima ...... G05B 19/4061
2017/0239814 A1 * 8/2017 Toyama .................. G04F 10/00
(Continued)

FOREIGN PATENT DOCUMENTS

DE 102012103830 A1 11/2012
DE 102015116522 B3 10/2016
(Continued)

OTHER PUBLICATIONS

German Office Action issued in related German Patent Application No. 102021105772.8 dated Nov. 12, 2021 (see partial English translation).

*Primary Examiner* — Khoi H Tran
*Assistant Examiner* — Nhi Q Bui
(74) *Attorney, Agent, or Firm* — Morgan, Lewis & Bockius LLP

(57) ABSTRACT

An acquisition section 42 acquires a pose at a clock time ti and a pose at a clock time tj for each of plural robots, and acquires structural information. Based on structural information a computation section 44 computes positions of the prescribed part for each of the robots at the clock times ti, tj and at a midway clock times tc. A possibility determination section determines a possibility of interference, based on any overlap between added-margin regions resulting from addition of a prescribed margin to a circumscribing shape containing positions of the prescribed part at the clock times ti, tj, and tc for each of the robots. In cases in which there is a possibility of interference, an end determination section 48 sets tc so as to be a new ti or a new tj, and causes processing of the computation section 44 and the possibility determination section 46 to be executed repeatedly until a spacing between the prescribed parts satisfies an end condition. When determined that the end condition has been satisfied, an interference determination section 50 determines whether or not there is interference between the prescribed parts between the robots at any of the positions at ti, tc, and tj.

12 Claims, 23 Drawing Sheets

(56) References Cited

U.S. PATENT DOCUMENTS

2019/0134815 A1* 5/2019 Fujii ...................... B25J 9/1607
2019/0240833 A1* 8/2019 Kimura ................. B25J 9/0081

FOREIGN PATENT DOCUMENTS

| DE | 102011001475 B4 | 3/2020 |
|----|-----------------|--------|
| DE | 102019102803 A1 | 8/2020 |
| EP | 1798618 B1 | 4/2011 |
| EP | 2561964 B1 | 11/2014 |
| JP | 2003-103491 A | 4/2003 |

* cited by examiner

FIG.18
LEVEL 2 (R-R)
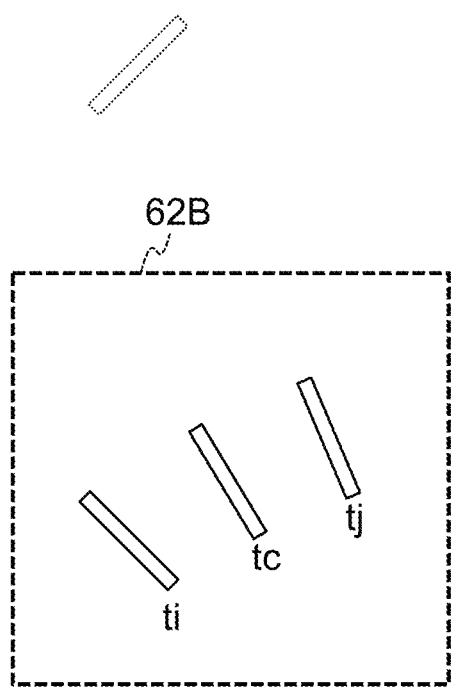
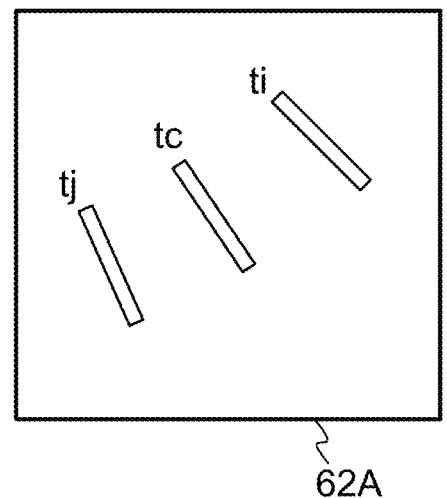

LEVEL 3 (R-L-L)

INTERFERENCE DETERMINATION DEVICE AND METHOD

CROSS-REFERENCE TO RELATED APPLICATION

This application is based on and claims the benefit of priority of the prior Japanese Patent Application No. 2020-044762, filed on Mar. 13, 2020, the entire contents of which are incorporated herein by reference.

BACKGROUND

Technical Field

The present disclosure relates to an interference determination device, an interference determination method, and an interference determination program.

Background Art

When generating movements for plural robots determination is performed as to whether or not the robots will interfere with each other. For example, for cases in which plural robots are moving at the same time, technology is proposed that considers slippages in inter-robot moving times, and checks for inter-robot interference for all combinations of moving times. In such technology, interference/non-interference is confirmed by combining inter-robot poses of a first and second multi-jointed robot at each moving time for moving times at a prescribed spacing apart, and then implementing a movement simulation. Such technology also represents the confirmed results in a graph having the movement time of each of the first and second multi-jointed robots on a first coordinate axis and a second coordinate axis. Then, in such technology, locations where inter-robot interference occurs between the first and second multi-jointed robots are indicated by marks in the plotting area of the graph, and an interference area that wraps around all of the marks a close distance away from each other is also indicated on the graph (Japanese Patent Application Laid-Open (JP-A) No. 2003-103492).

SUMMARY OF INVENTION

Technical Problem

However, when configured such that interference determination is performed at every moving time for a prescribed spacing, the precision of determination is coarse if the prescribed spacing is too long, leading to a possibility that interference might be overlooked. However, in cases in which a configuration is adopted in which the prescribed spacing is too short in order to perform interference determination with good precision, a problem arises in that interference determination takes a long time.

In consideration of the above circumstances, an object of the present disclosure is to shorten the time for inter-robot interference determination when performing movement generation for plural robots.

Solution to Problem

In order to achieve the above object, an interference determination device according to the present disclosure includes an acquisition section, a computation section, a possibility determination section, an end determination section, and an interference determination section. The acquisition section acquires a first pose and a second pose for each of plural robots, and structural information. The computation section, based on structural information for each of the plural robots, is configured to compute for a prescribed part of each of the plural robots, a first position in the first pose, a second position in the second pose, and a midway position on a trajectory between the first pose and the second pose. The possibility determination section determines a possibility of inter-robot interference in a case in which each of the plurality of robots moves from the first pose to the second pose. This is performed based on any overlap between added-margin regions resulting from addition of a prescribed margin to a circumscribed shape containing the prescribed part of each of the plural robots for the first positions, for the second positions, and for the midway positions. In a case in which a possibility of interference has been determined by the possibility determination section, the end determination section is configured to set the midway position so as to be a new position for the first position or so as to be new position for the second position and causes processing of the computation section and the possibility determination section to be executed repeatedly until a predetermined condition is satisfied, with the predetermined condition being that a distance from the first position to the midway position and a distance from the second position to the midway position are sufficiently small distances. In a case in which the end determination section has determined the distances to satisfy the condition, is configured to determine whether or not there is interference between the prescribed parts of the plural robots at any of the first positions, the second positions, or the midway positions.

Moreover, a configuration may be adopted in which the computation section computes, as the midway position, a position on the trajectory having a distance from the first position or from the second position midway between the first position and the second position.

Moreover, a configuration may be adopted in which the computation section computes, as the midway position, a position of the prescribed part at a midway pose between the first pose and the second pose.

Moreover, a configuration may be adopted in which the computation section computes, as a midway pose, a pose of a robot at a midway clock time between a clock time of the first pose and a clock time of the second pose, and computes, as the midway position, a position of the prescribed part in the midway pose.

Moreover, a configuration may be adopted in which the possibility determination section determines the margin as a longer distance from among the distance from the first position to the midway position or the distance from the second position to the midway position.

Moreover, a configuration may be adopted in which the possibility determination section determines the margin based on a predetermined relationship between an amount of change in pose of a robot and an amount of change of position of the prescribed part.

Moreover, a configuration may be adopted in which the possibility determination section takes, as the circumscribed shape, a bounding sphere, an axis aligned bounding box, an oriented bounding box, or a convex hull.

Moreover, a configuration may be adopted in which the end determination section determines the condition to be satisfied in a case in which the distance is not more than a prescribed value.

Moreover, a configuration may be adopted in which the end determination section sets the prescribed value to a larger value as an inter-robot distance between the prescribed parts increases.

Moreover, a configuration may be adopted in which the possibility determination section determines a possibility of interference between the prescribed part and an obstruction in a case in which the plural robots move from the first pose to the second pose, based on any overlap between a region where the obstruction is present at a periphery of the plural robots and the added-margin regions resulting from addition of a prescribed margin to a circumscribed shape containing the prescribed part. In a case in which the end determination section has determined the distance to satisfy the condition, the interference determination section determines interference with the obstruction at each of the first position, the second position, and the midway position.

An interference determination method according to the present disclosure is an interference determination method wherein: an acquisition section acquires a first pose and a second pose for each of plurality of robots, and structural information; based on structural information for each of the plurality of robots, a computation section computes for a prescribed part of each of the plurality of robots, a first position in the first pose, a second position in the second pose, and a midway position on a trajectory between the first pose and the second pose; a possibility determination section determines a possibility of inter-robot interference in a case in which each of the plurality of robots moves from the first pose to the second pose, based on any overlap between added-margin regions resulting from addition of a prescribed margin to a circumscribed shape containing the prescribed part of each of the plurality of robots at any of the first positions, the second positions, and the midway positions; an end determination section sets the midway position so as to be a new position for the first position or so as to be new position for the second position in a case in which a possibility of interference has been determined by the possibility determination section, the end determination section causing processing of the computation section and the possibility determination section to be executed repeatedly until a predetermined condition is satisfied, with the predetermined condition being that a distance from the first position to the midway position and a distance from the second position to the midway position are sufficiently small distances; and an interference determination section determines whether or not there is interference between the prescribed parts of the plurality of robots at any of the first positions, the second positions, or the midway positions in a case in which the end determination section has determined the distances to satisfy the condition.

An interference determination program according to the present disclosure is a program executable by a computer to function as: an acquisition section, a computation section, a possibility determination section, an end determination section, and an interference determination section. The acquisition section acquires a first pose and a second pose for each of plurality of robots, and structural information. The computation section, based on structural information for each of the plurality of robots, is configured to compute for a prescribed part of each of the plurality of robots, a first position in the first pose, a second position in the second pose, and a midway position on a trajectory between the first pose and the second pose. The possibility determination section determines a possibility of inter-robot interference in a case in which each of the plurality of robots moves from the first pose to the second pose. This is performed based on any overlap between added-margin regions resulting from addition of a prescribed margin to a circumscribed shape containing the prescribed part of each of the plurality of robots for the first positions, for the second positions, and for the midway positions. In a case in which a possibility of interference has been determined by the possibility determination section, is configured to set the midway position so as to be a new position for the first position or so as to be new position for the second position and causes processing of the computation section and the possibility determination section to be executed repeatedly until a predetermined condition is satisfied, with the predetermined condition being that a distance from the first position to the midway position and a distance from the second position to the midway position are sufficiently small distances. In a case in which the end determination section has determined the distances to satisfy the condition, is configured to determine whether or not there is interference between the prescribed parts of the plurality of robots at any of the first positions, the second positions, or the midway positions.

The interference determination device, method, and program according to the present disclosure enable shortening of the time for inter-robot interference determination when generating movements for plurality of robots.

BRIEF DESCRIPTION OF DRAWINGS

FIG. 18 is diagram illustrating positions of claws at each clock time in Level 2 (R-R) and regions to determine the possibility of interference.

DESCRIPTION OF EMBODIMENTS

Figure 1:
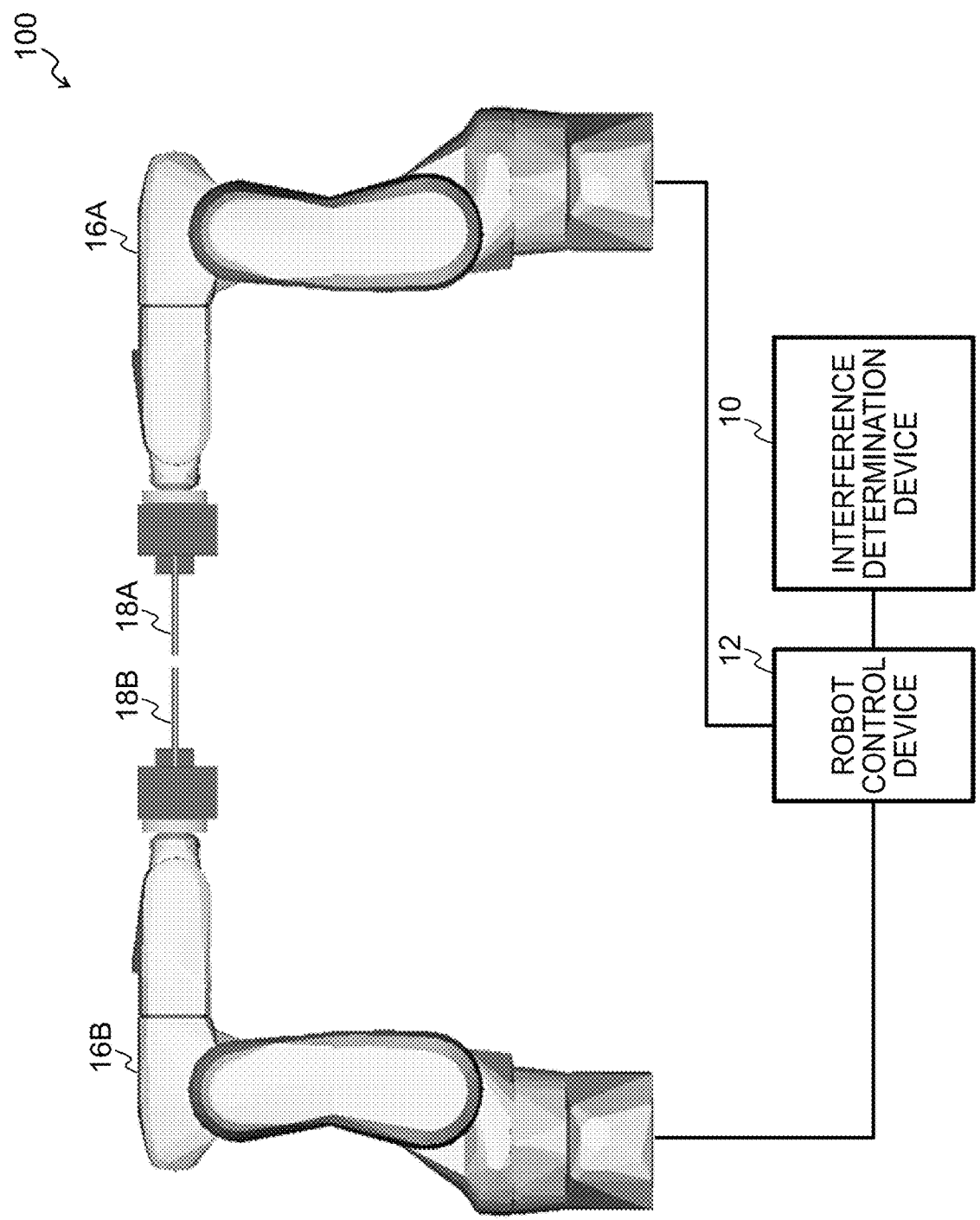
FIG. 1 is a schematic diagram illustrating a configuration of a robot control system.

Explanation follows regarding an example of an exemplary embodiment of the present disclosure, with reference to the drawings. Note that the same or equivalent configuration elements and portions are appended with the same reference numerals in each of the drawings. Moreover, the dimensions and proportions in the drawings have been exaggerated in the drawings for ease of explanation, and are sometimes different to actual proportions.

As illustrated in FIG. 1, a robot control system 100 according to the present exemplary embodiment is configured including an interference determination device 10, a robot control device 12, and robots 16A, 16B. Note that although the example of FIG. 1 includes two robots 16A, 16B in the robot control system 100, three or more robots may be included therein. Moreover, when describing the robots 16A, 16B without differentiating therebetween they will be referred to below simply as "robot 16".

The robot 16 is, for example, configured with six degrees of freedom needed to move in three-dimensional space, and is a vertical articulated robot including plural links, and joints that connect the links together. Note that a configuration may be adopted in which the degrees of freedom of the robot 16 is seven degrees of freedom, by adding a redundant degree of freedom to the six degrees of freedom. In the present exemplary embodiment, there are claw shaped tools (hereafter referred to simply as "claws") 18A, 18B attached to the respective links on the distal side of each of the robots 16A, 16B. The claws 18A, 18B serve as examples of "prescribed part" of the present disclosure. When describing the claws 18A, 18B without differentiating therebetween they will be referred to below simply as "claw 18". The robot 16 moves under control of the robot control device 12 according to trajectory information generated in the robot control device 12.

The robot control device 12 generates trajectory information for each of the robots 16 based on determination results output from the interference determination device 10, and controls the movements of the robots 16 according to the generated trajectory information.

The interference determination device 10 determines whether or not the prescribed parts (the claws 18 in the present exemplary embodiment) on the robot 16A and the robot 16B will interfere when the robots 16A, 16B are moved according to the robot trajectory information. The interference determination device 10 outputs the result of determination to the robot control device 12.

In the present exemplary embodiment, the trajectory information is a time series including an array of poses and speed of change in pose at each clock time for the robots 16, when prescribed positions such as leading ends of the claws 18 of the robots 16 are moved from a given start point to a given end point. The poses of the robots 16 are, when the claws 18 of the robots 16 are considered to be in specific positions (x, y, z) and specific orientations (roll, pitch, yaw), expressed as a series $(\theta_{J1}, \theta_{J2}, \ldots, \theta_{JN})$ of values (rotation angles) for each joint of the robots 16, from a first joint (joint J1) to an Nth joint (joint JN, wherein N is the number of joints in the robot).

Figure 2:
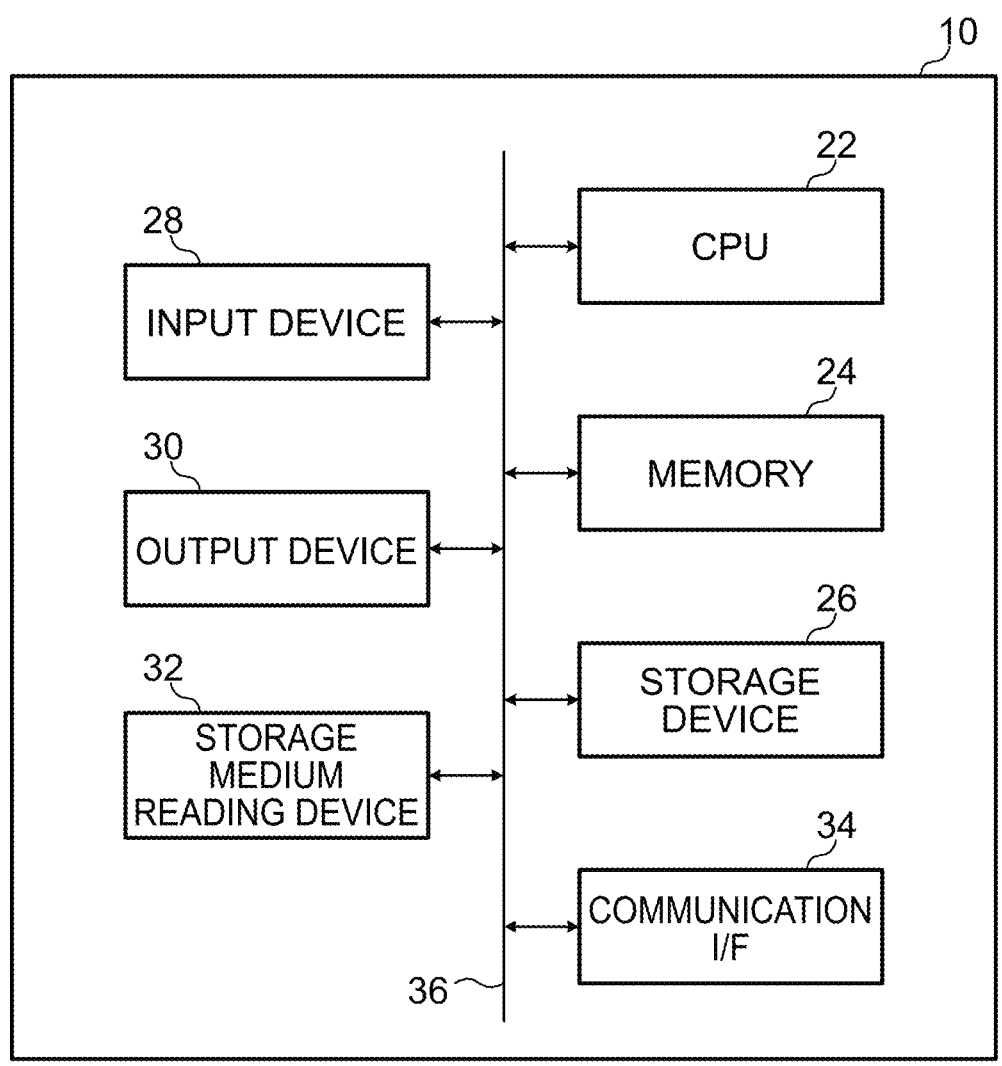
FIG. 2 is a block diagram illustrating a hardware configuration of an interference determination device.

FIG. 2 is a block diagram illustrating a hardware configuration of the interference determination device 10 according to the present exemplary embodiment. As illustrated in FIG. 2, the interference determination device 10 includes a central processing unit (CPU) 22, memory 24, a storage device 26, an input device 28, an output device 30, a storage medium reading device 32, and a communication interface (I/F) 34. These configuration elements are connected together through a bus 36 so as to be capable of communicating with each other.

An interference determination program stored in the storage device 26 is for executing interference determination processing, described later. The CPU 22 is a central processing unit, and executes various programs, and controls the configuration elements. Namely, the CPU 22 reads a program from the storage device 26 and executes the program using the memory 24 as a workspace. The CPU 22 performs control of the configuration elements described above and performs various computation processing according to the program stored in the storage device 26.

The memory 24 is configured by random access memory (RAM), and serves as workspace to temporarily store programs and data. The storage device 26 is configured by read only memory (ROM), such as a hard disk drive (HDD), solid state drive (SSD), or the like. Various programs including an operating system and various data are stored on the storage device 26.

The input device 28 is, for example, a device such as a keyboard, mouse, or the like that performs various input. The output device 30 is, for example, a device such as a display, printer, or the like for outputting various data. A configuration may be adopted in which, by employing a touch panel display for the output device 30, the output device 30 also functions as the input device 28. The storage medium reading device 32 reads data stored on various storage media, such as a compact disc read only memory (CD-ROM), digital versatile disc (DVD)-ROM, Blu-ray Disc, universal serial bus (USB) memory, and the like, and writes data to the storage media.

The communication I/F 34 is an interface for communicating with another machine and, for example, employs a standard such as Ethernet (registered trademark), FDDI, Wi-Fi (registered trademark), or the like.

Figure 3:
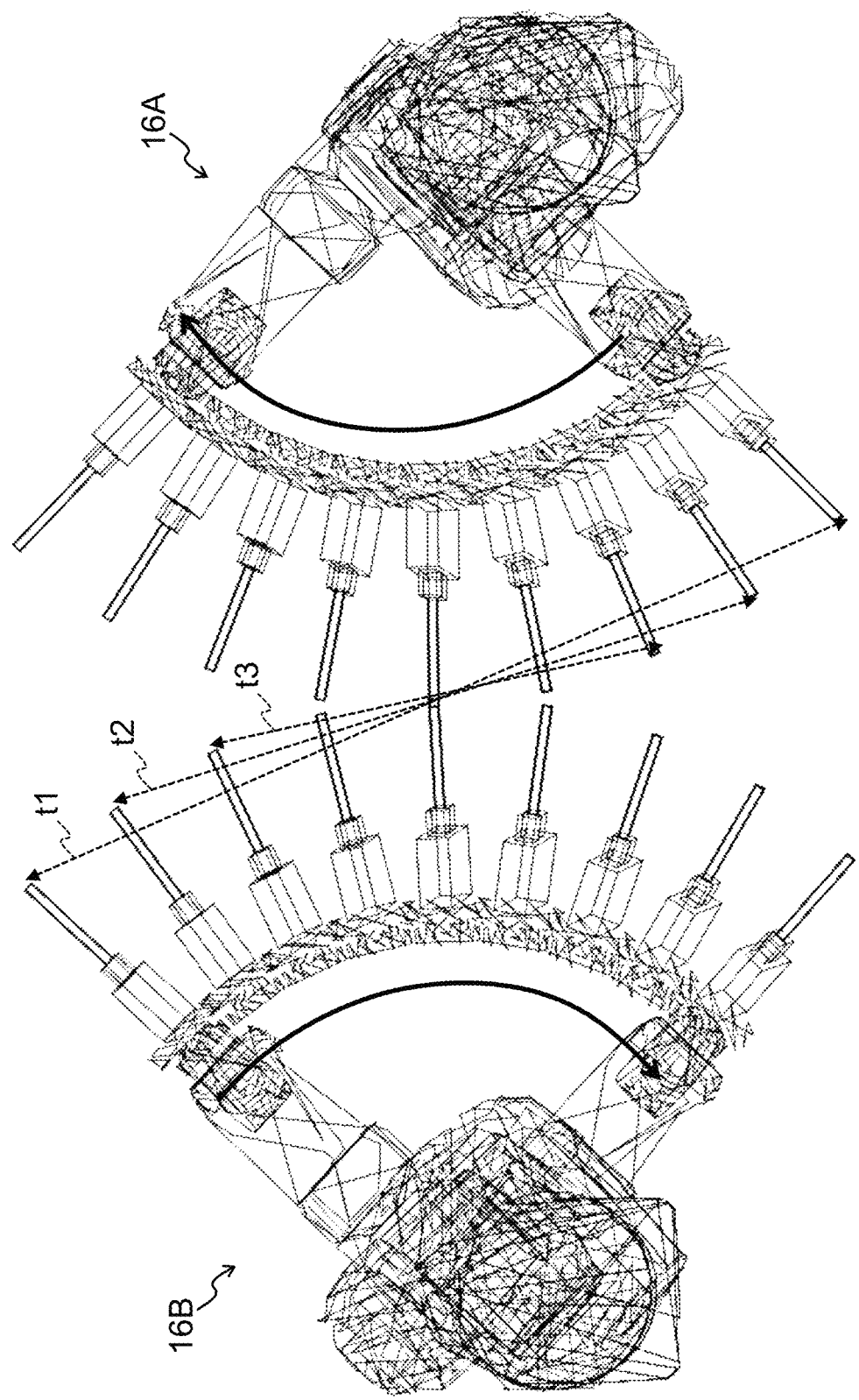
FIG. 3 is a diagram to explain interference determination by conventional technology.

In conventional technology, as illustrated in FIG. 3, inter-robot interference determination is interference determination performed by segmenting the movements of each of the robots at a prescribed spacing from a movement start clock time t1 to a movement end clock time tn, and determining interference at each clock time (t1, t2, t3, . . . , tn). More specifically, the profile of a prescribed part (a claw in the present exemplary embodiment) is found, as determined from the pose of the robot 16 at each clock time, and determination is then made as to whether or not the prescribed part of the robot 16A interferes with the prescribed part of the robot 16B at the same clock time.

Figure 4:
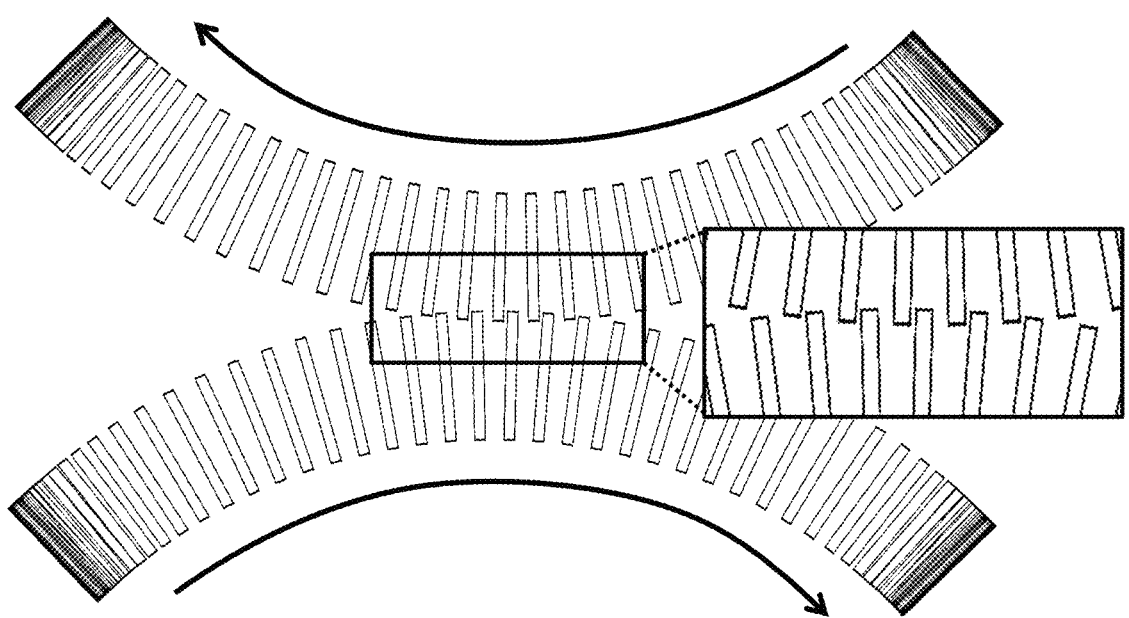
FIG. 4 is a diagram to explain problems with interference determination by conventional technology.

In such cases, if the prescribed spacing is set too long then, as illustrated in FIG. 4, the determination precision is coarse, leading to a higher possibility that interference might be overlooked. Note that FIG. 4 illustrates a displacement pattern of portions of the claws 18 when the movement of the claw links of the respective robots 16 are viewed from above. Note that in FIG. 4, the displacement of the claw illustrated at the upper side (a circular arc convex on the lower side) is movement of the claw 18A of the robot 16A, and represents a movement of the claw 18A from the right of the page to the left. The displacement of the claw illustrated at the lower side (a circular arc convex on the upper side) is movement of the claw 18B of the robot 16B, and represents a movement of the claw 18B from the left of the page to the right. Similar applies in subsequent drawings.

Figure 5:
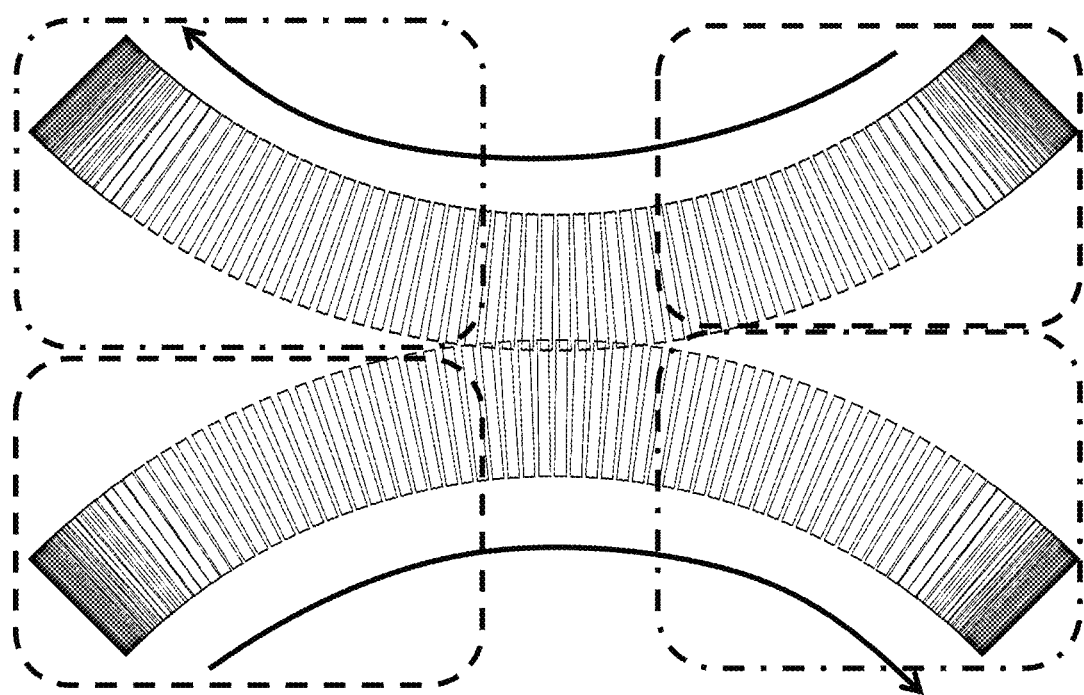
FIG. 5 is a diagram to explain problems with interference determination by conventional technology.

On the other hand, if the prescribed spacing is set too short, the number of times interference determination is made from t1 to tn is large, resulting in a long time being taken for interference determination. Moreover, as illustrated in FIG. 5, even though it is obvious interference will not occur between the segments surrounded by dashed lines and the segments surrounded by single dot broken lines, precise interference determination is still performed here, and so wasted effort occurs in interference determination.

Thus in the interference determination device 10 according to the present disclosure present exemplary embodiment, interference determination is performed while gradually homing-in on the clock time intervals where interference looks like it might occur, thereby shortening the time taken for interference determination. Explanation follows regarding a functional configuration of the interference determination device 10 according to the present exemplary embodiment.

Figure 6:
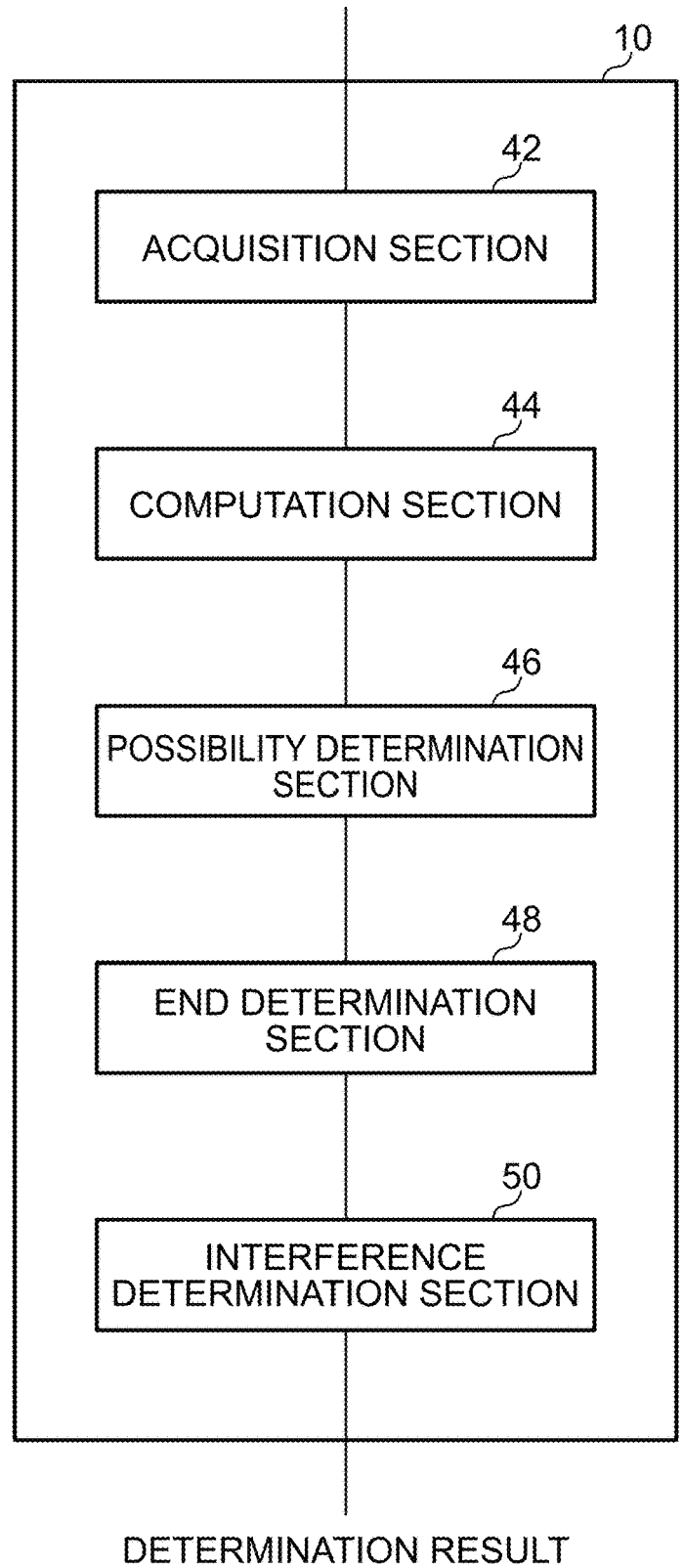
FIG. 6 is a block diagram illustrating an example of a functional configuration of an interference determination device.

FIG. 6 is a block diagram illustrating an example of a functional configuration of the interference determination device 10. As illustrated in FIG. 6, a functional configuration of the interference determination device 10 includes an acquisition section 42, a computation section 44, a possibility determination section 46, an end determination section 48, and an interference determination section 50. Each element of this functional configuration is implemented by the CPU 22 reading out an interference determination program stored on the storage device 26, expanding the interference determination program into the memory 24, and executing the program.

The acquisition section 42 acquires information input to the interference determination device 10, including a start pose and an end pose of each of the robots 16, and structural information including kinematic information and shape information for each of the robots 16. In the present exemplary embodiment, the interference determination device 10 performs interference determination for each node interval in a series of movements of the robots 16 generated by motion planning. Each node corresponds to a pose partway through the series of movements. Thus for movement of a node interval having a start clock time t1 and an end clock time tn, the start pose described above is the pose at clock time t1, and the end pose is the pose at clock time tn.

Based on structural information for each of the robots 16, the computation section 44 computes first positions of the claws 18 for each of the robots 16 at a first pose, and computes second positions thereof at a second pose therefor. The first poses are poses of the robots 16 at clock time ti, and the second poses are poses of the robot 16 at clock time tj. At the start time of interference determination, clock time ti=clock time t1 and clock time tj=clock time tn. Namely, at the start time of interference determination, the first poses are the start poses and the second poses are the end poses.

Moreover, the computation section 44 computes a midway position for each of the prescribed parts along a trajectory between the first pose and the second pose. For example, on the trajectory from the first pose to the second pose, the computation section 44 may compute as the midway position a distance from the first position or from the second position when the position is midway between the first position and the second position. Moreover, for example, the computation section 44 may compute as the midway position, a position of the claw 18 at a midway pose between the first pose and the second pose. The midway pose is a pose of the robot 16 when each of the joints is at an angle midway in the rotation angle of the respective joint between the first pose and the second pose.

Figure 7:
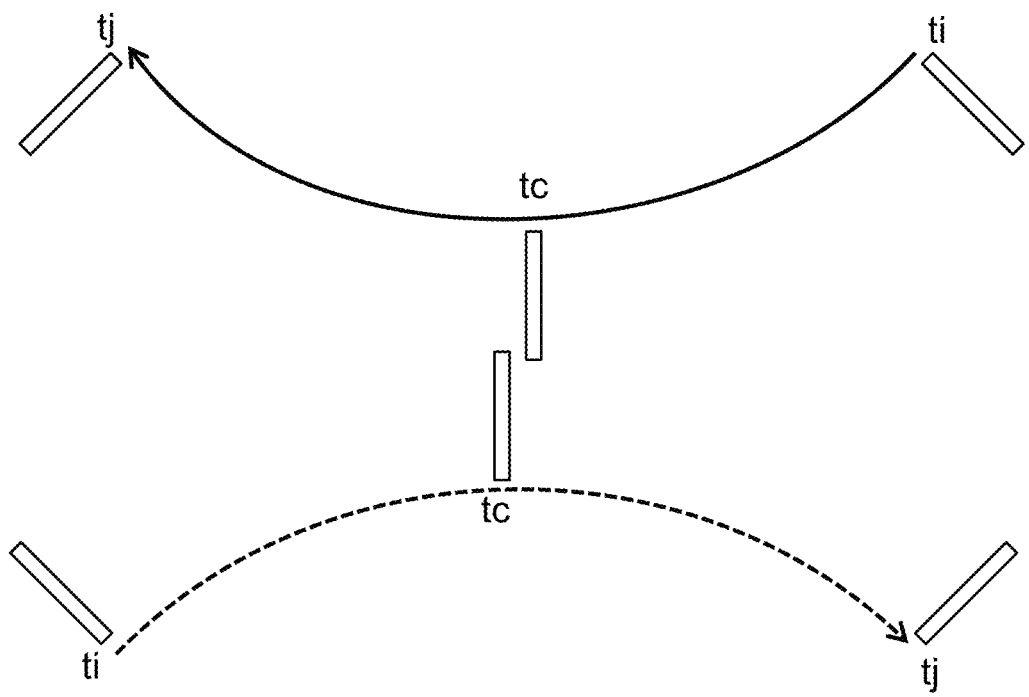
FIG. 7 is a diagram to explain computation of a midway position.

Moreover, for example, the computation section 44 may compute, as the midway pose, a pose of the robot 16 at a midway clock time tc between clock time ti when the robot 16 is in the first pose, and a clock time tj when in the second pose. The computation section 44 may then compute as the midway position the position of the claw 18 at this midway pose. The midway clock time tc may be taken as tc=(tj−ti)/2, or may be any clock time in a prescribed range around (tj−ti)/2. In the following an explanation will be given of a case in which the midway position is computed based on midway clock time tc, as illustrated in FIG. 7. Note that the profile of the claws 18 at each clock time is drawn at each of these clock times in FIG. 7. Similar applies in subsequent drawings.

Note that the computation section 44 may compute, as the position of the claws 18, a position of a prescribed portion of the claws 18, such as a distal end portion, center portion, or the like, by computation using forward kinematics from the respective poses of the robots 16.

Figure 8:
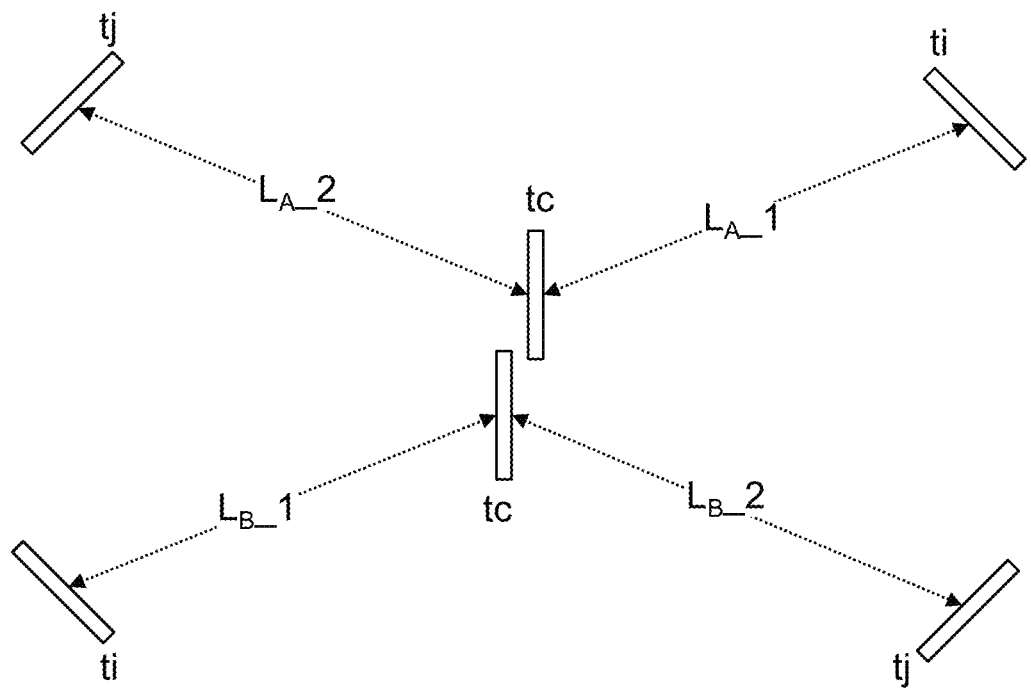
FIG. 8 is a diagram to explain a margin for setting a region to determine the possibility of interference.

The possibility determination section 46 finds added-margin regions by taking respective positions at the clock time ti, the clock time tc, and the clock time tj of the respective robots 16, adding a prescribed margin to a circumscribing shape containing the profiles of the claws 18, and adding the circumscribing shape to find each respective region. For example, as illustrated in FIG. 8, the possibility determination section 46 finds, for the claw 18A of the robot 16A, a distance $L_{A\_}1$ between a position at clock time ti and a position at clock time tc, and a distance $L_{A\_}2$ between the position at clock time tc and a position at clock time tj. The possibility determination section 46 is then able to take a distance of the longer out of distance $L_{A\_}1$ and distance $L_{A\_}2$ as the above mentioned margin $L_A$ for the robot 16A. Similarly, the possibility determination section 46 finds, for the claw 18B of the robot 16B, a distance $L_{B\_}1$ between a position at clock time ti and a position at clock time tc, and a distance $L_{B\_}2$ between the position at clock time tc and a position at clock time tj. The possibility determination section 46 is then able to take a distance of the longer out of distance $L_{B\_}1$ and distance $L_{B\_}2$ as the above mentioned margin $L_B$ for the robot 16B.

Moreover, the possibility determination section 46 may determine the margin based on a predetermined relationship between an amount of change in pose of the robots 16 and an amount of change in position of the claws 18. For example, in cases in which a pre-defined relationship is that the claw 18 is displaced by a maximum of 5 cm when a joint is rotated 1°, the possibility determination section 46 may determine the margin to be 25 cm for a case in which the joint rotates 5° from the first pose to the second pose.

Moreover, as the circumscribing shape mentioned above, the possibility determination section 46 may employ, for example, a bounding sphere, an axis aligned bounding box (AABB), an oriented bounding box (OBB), a convex hull, or the like. In the following an example will be described of a case in which an AABB is employed as the circumscribing shape.

Figure 9:
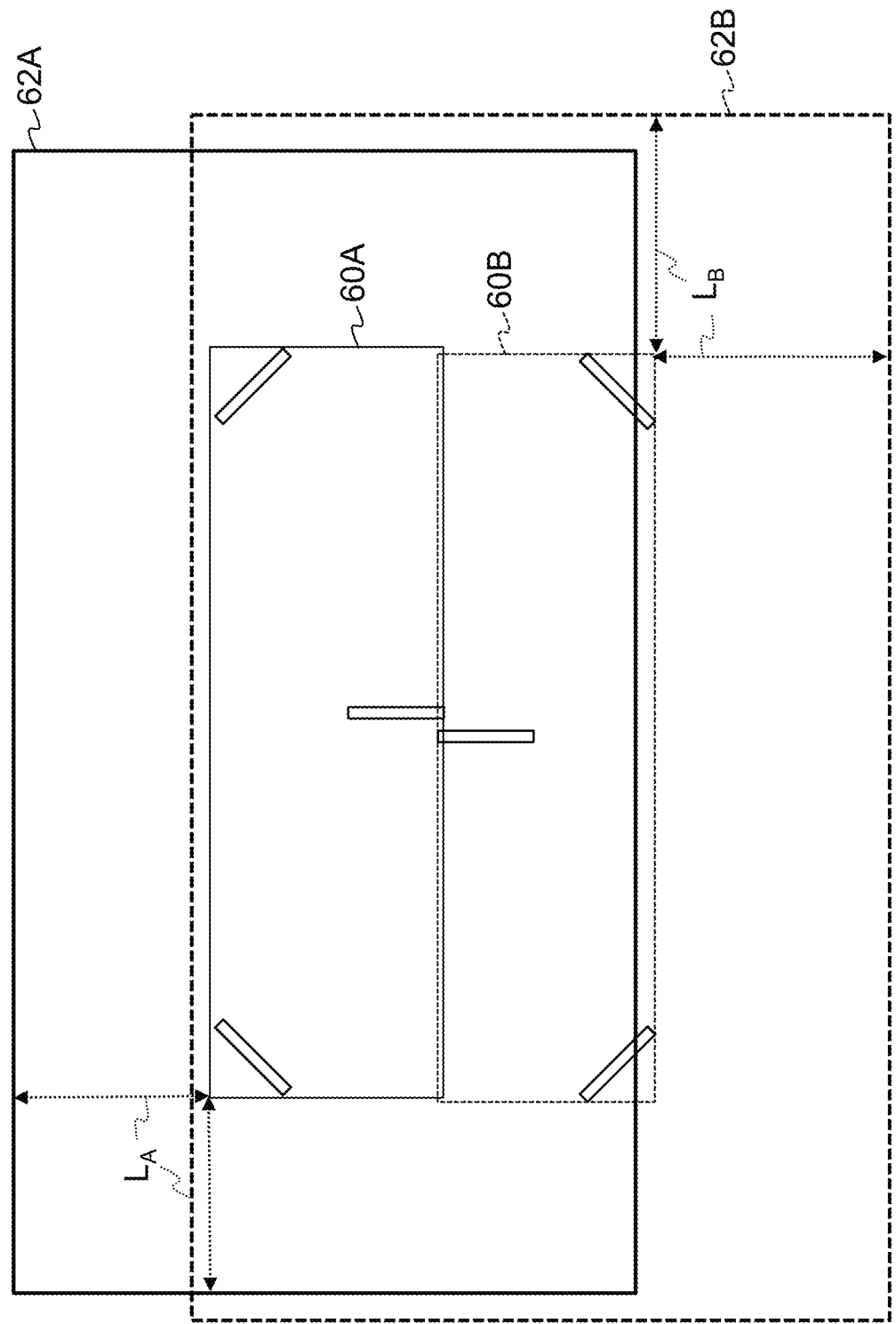
FIG. 9 is a diagram illustrating an example of a cases in which there is an overlap of regions to determine the possibility of interference.

FIG. 9 illustrates an example of a region found for each of the robots 16. Note that although in FIG. 9, for ease of explanation, each region is illustrated in a two-dimension plan view, in reality the region is found in three-dimensional space. Similar applies to the following drawings. In the example of FIG. 9, a region 62A is found by adding a margin $L_A$ to a circumscribing shape 60A for the robot 16A, and a region 62B is found by adding a margin $L_B$ to a circumscribing shape 60B for the robot 16B.

Figure 10:
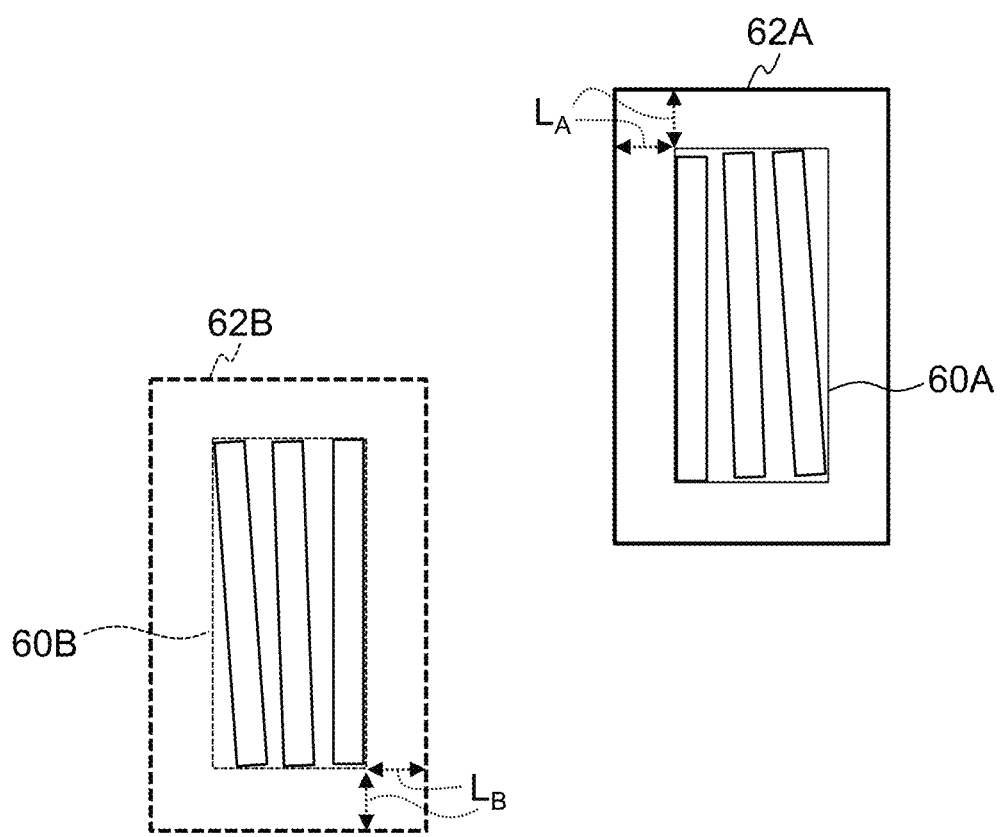
FIG. 10 is a diagram illustrating an example of a cases in which there is no overlap of regions to determine the possibility of interference.

Based on there being an overlap between the found regions, the possibility determination section 46 determines there to be a possibility of interference between the robots 16 when the respective robots 16 move from clock time ti to clock time tj. More specifically, as illustrated in FIG. 9, the possibility determination section 46 determines there to be a possibility of interference between the robots 16 when the region 62A found for the robot 16A overlaps with the region 62B found for the robot 16B. However, the possibility determination section 46 determines there to be no possibility of interference between the robots 16 when there is no overlap between the regions 62A, 62B. FIG. 10 illustrates a case in which there is no overlap between the regions 62A, 62B, namely, a case in which determination is that there is not a possibility of interference between the robots 16.

In cases in which determination by the possibility determination section 46 is that there is a possibility of interference, the end determination section 48 determines whether or not a condition of the distances $L_A\_1$, $L_A\_2$, $L_B\_1$, $L_B\_2$, namely the distance of spacing between the claws 18, being sufficiently small is satisfied as a predetermined end condition. In cases in which the spacing between the claws 18 does not satisfy the end condition, the end determination section 48 sets the position at clock time tc so as to be a new position at clock time ti or so as to be a new position at clock time tj, and then causes repetition of execution of the processing of the computation section 44 and the possibility determination section 46. Moreover, in cases in which the spacing between the claws 18 does satisfy the end condition, the end determination section 48 determines to end repetition of the processing of the computation section 44 and the possibility determination section 46.

Figure 11:
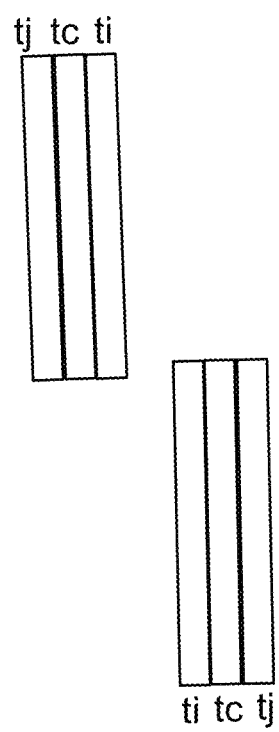
FIG. 11 is a diagram to explain end determination.
Figure 12:
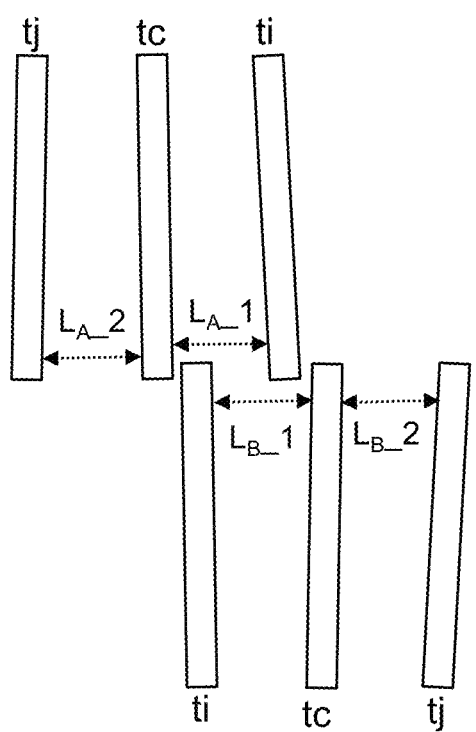
FIG. 12 is a diagram to explain end determination.

More specifically, the end determination section 48 may be configured so as to determine that the end condition has been satisfied in cases in which the spacing between the claws 18 is sufficiently small. For example, the end determination section 48 may be configured so as to determine that the spacing between the claws 18 is sufficiently small in cases in which the spacing between the claws 18 is a not more than a prescribed value. The prescribed value may, for example as illustrated in FIG. 11, be predetermined as a value deemed to indicate that there is no gap between the profiles of the claws 18 at each of the positions, or a value not more than the width of the claws 18. In such cases, as illustrated in FIG. 12, the end determination section 48 determines that the end condition has not been satisfied in cases in which the spacing between the claws 18 exceeds the prescribed value.

Note that the end determination section 48 may be configured so as to set the prescribed value to larger values as the inter-robot 16 distance between the respective claws 18 at the same clock time increases. This is because in cases in which the inter-robot 16 distance between the claws 18 of the respective robots at the same clock time is sufficiently distanced, there is a high probability that there will be no determination of interference even were determination to be performed at even finer timings.

Figure 13:
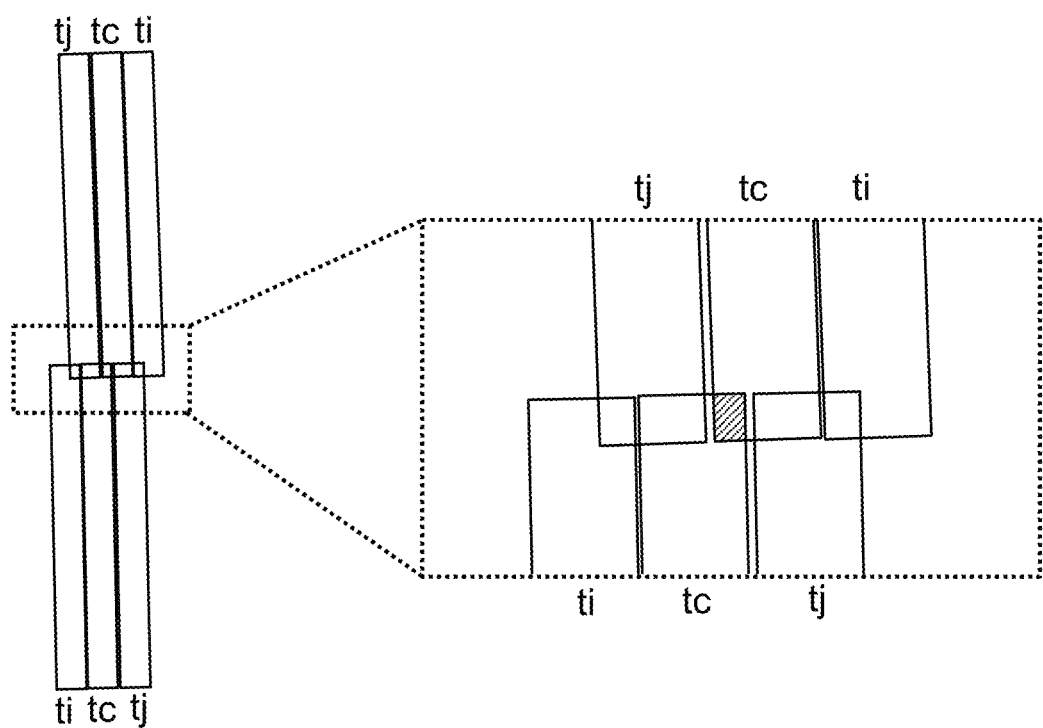
FIG. 13 is a diagram to explain interference determination.

When determination by the end determination section 48 has been made that the spacing between the claws 18 satisfies the end condition, the interference determination section 50 then determines whether or not the claws 18 of the respective robots 16 interfere with each other at any of the clock time ti, the clock time tc, or the clock time tj. More specifically, as illustrated in FIG. 13, the interference determination section 50 determines interference/non-interference by whether or not ranges indicating the profiles of the claws 18 of the respective robots 16 overlap with each other at the same clock time. In the example illustrated in FIG. 13, there is an overlap between the inter-robot claws 18 at clock time tc (the diagonally shaded portion in FIG. 13), and so the interference determination section 50 determines that interference would occur at clock time tc. The interference determination section 50 outputs the determination result.

Figure 14:
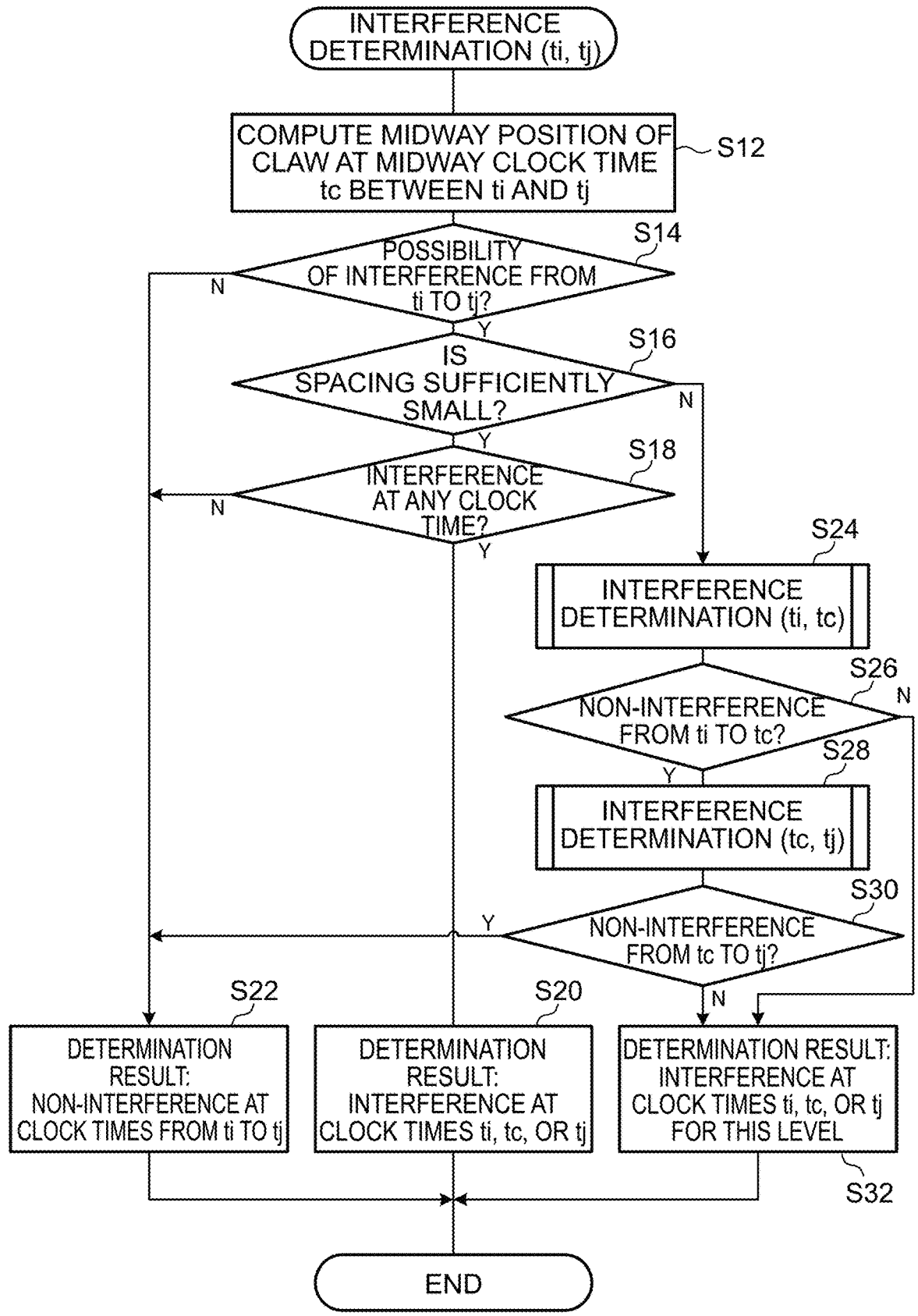
FIG. 14 is a flowchart illustrating a flow of interference determination processing.

Next, description follows regarding operation of the interference determination device 10 according to the present exemplary embodiment. FIG. 14 is a flowchart illustrating a flow of interference determination processing executed by the CPU 22 of the interference determination device 10. The CPU 22 functions as each of the functional configuration elements of the interference determination device 10 by the CPU 22 reading the interference determination program from the storage device 26, expanding the program in the memory 24, and executing the program. The interference determination processing (ti, tj) illustrated in FIG. 14 is accordingly executed thereby. Note that at the start of the interference determination processing the clock time ti=the clock time t1, and the clock time tj=the clock time tn.

At step S12, the acquisition section 42 acquires information input to the interference determination device 10 including the start pose (pose at clock time t1) and the end pose (pose at clock time tn) for each of the robots 16, and structural information including kinematic information and shape information for each of the robots 16. The computation section 44 then computes, as midway poses, the poses of the robots 16 at the midway clock time tc between clock time ti and clock time tj and then computes, as midway positions, the positions of each of the claws 18 at these midway poses.

Next, at step S14, the possibility determination section 46 finds, for each of the robots 16, added-margin regions resulting from adding a prescribed margin to the circumscribing shapes containing the profiles of the claws 18 at each of the positions at the clock time ti, the clock time tc, and the clock time tj. The possibility determination section 46 then determines the possibility of interference between the robots 16 when the robots 16 move from the clock time ti to the clock time tj, based on any overlap between the found regions. When the regions overlap the possibility determination section 46 determines there to be a possibility of interference from the clock time ti to the clock time tj, and processing then transitions to step S16. However, in cases in which there is no overlap between the regions, the possibility determination section 46 determines there to be no possibility of interference from the clock time ti to the clock time tj, and processing then transitions to step S22.

At step S16, the end determination section 48 determines whether or not the spacing between the claws 18 is sufficiently small by determining whether or not the spacing between the claws 18 satisfies the predetermined end condition. In cases in which the spacing between the claws 18 is sufficiently small, processing then transitions to step S18.

However, processing then transitions to step S24 in cases in which the spacing between the claws 18 does not satisfy the end condition.

At step S18, the interference determination section 50 determines interference/non-interference by whether or not the ranges indicating the profiles of the claws 18 of the respective robots 16 overlap with each other at the clock time ti, the clock time tc, or the clock time tj. Processing then transitions to step S20 in cases in which interference occurs at any of these clock times. However, processing then transitions to step S22 in cases in which interference does not occur at any of these clock times, namely, in cases of non-interference.

At step S20, the interference determination section 50 outputs the determination result that interference has occurred at the clock time ti, the clock time tc, or the clock time tj. However, at step S22, the interference determination section 50 outputs a determination result of non-interference from the clock time ti to the clock time tj. The interference determination processing is then ended.

Moreover, at step S24, the end determination section 48 sets a position of the claws 18 at clock time tc to so as to be the position of the claws 18 for a new clock time tj, and recursively executes the interference determination processing (ti, tc) but this time for the front half portion of interval from ti to [initial] tj.

Next, at step S26, the end determination section 48 determines whether or not non-interference has been determined at step S24 for the interval from clock time ti to tc (which was newly set to tj at step S24). This determination may be performed by determining whether or not the recursively executed interference determination processing that ended passed through either step S20 or step S22 of the interference determination processing recursively executed at step S24. Non-interference is determined for cases in which processing passed through step S22, and processing then transitions to step S28. However, occurrence of interference is determined for cases in which processing passed through step S20, and processing then transitions to step S32.

At step S28, the end determination section 48 sets the positions of the claws 18 at the clock time tc so as to be the position of the claws 18 for a new clock time ti, and recursively executes the interference determination processing (tc, tj) for the back half portion of the duration from ti to tj.

Next, at step S30, the end determination section 48 determines whether or not non-interference has been determined at step S28 for the interval from the clock time tc (which was newly set to ti at step S28) to tj. Similarly to at step S26, this determination may be performed based on the determination result of interference determination processing recursively executed at step S28. Processing then transitions to step S22 in cases in which non-interference has been determined, and processing then transitions to step S32 in cases in which occurrence of interference was determined.

At step S32, the interference determination section 50 outputs a determination result of step S20 for the interference determination processing recursively executed by step S24 or step S28. Namely, the interference determination section 50 outputs a determination result of interference occurrence at the clock time ti, the clock time tc, or the clock time tj set at step S24 or step S28, and ends the interference determination processing.

Figure 15:
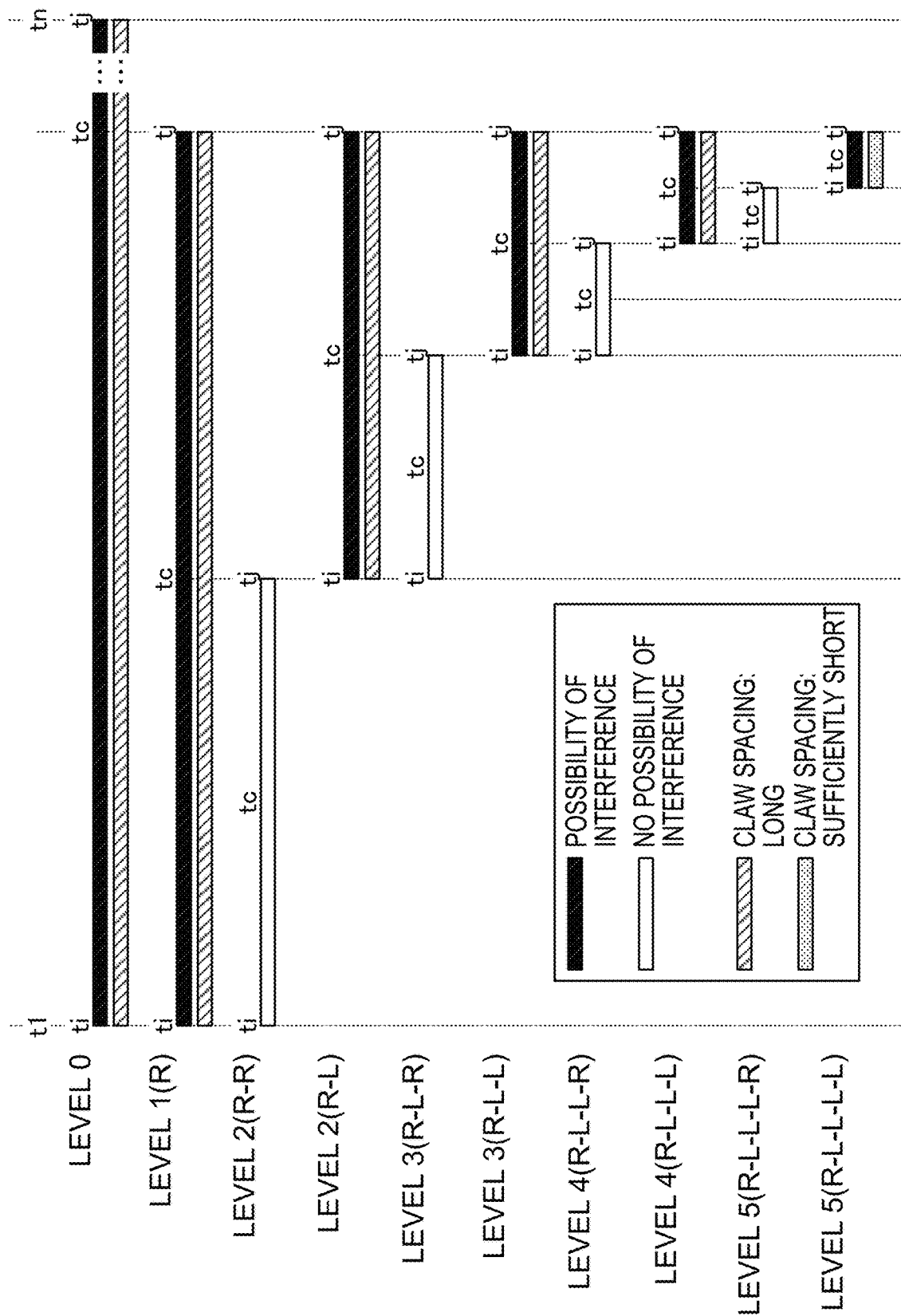
FIG. 15 is a diagram illustrating a relationship between clock times $t_i$, $t_c$, $t_j$ set at each Level.

More detailed explanation will now be given regarding the flow of the interference determination processing described above, with reference to FIG. 15 to FIG. 23. In the following, Level i is employed to indicate a depth in the interference determination processing being recursively executed, with the Level at the start of the interference determination processing being Level 0. Moreover, "R" is employed to indicate the interference determination processing executed at step S24, and "L" is employed to indicate interference determination processing being executed at step S28. For example, if the interference determination processing of step S28 is recursively called when the interference determination processing of step S24 is being recursively executed at Level 1, then this is denoted by "Level 2 (R-L)". Moreover, FIG. 15 is a diagram illustrating relationships between the clock times ti, tc, tj set at each Level, and illustrates correspondences between the durations ti to tj at each Level, the possibility/non-possibility of interference (determination results of step S14), and whether or not the inter-claw 18 spacings satisfy the end condition (determination result of step S16), as represented by the display of bars. Moreover, FIG. 16 to FIG. 23 are diagrams illustrating positions of the claws 18 at each of the clock times at each of the Levels, and the regions 62 employed to determine the interference possibility at each of the Levels.

Figure 16:
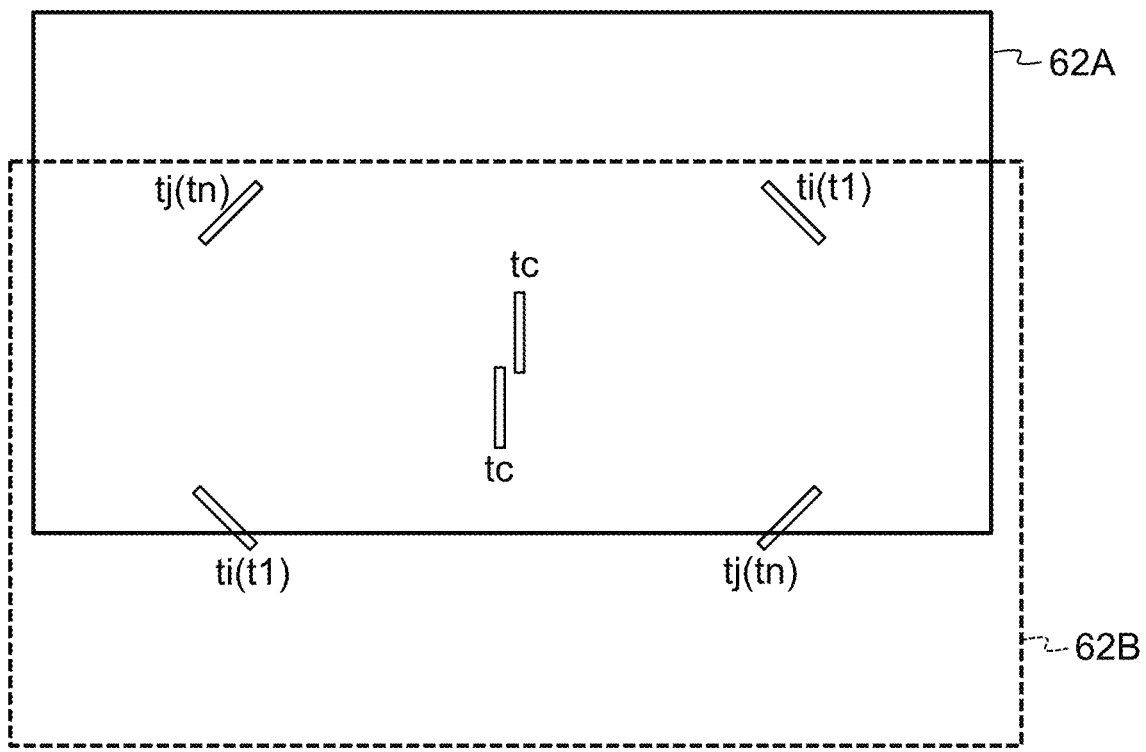
FIG. 16 is a diagram illustrating positions of claws at each clock time in Level 0 and regions to determine the possibility of interference.
Figure 17:
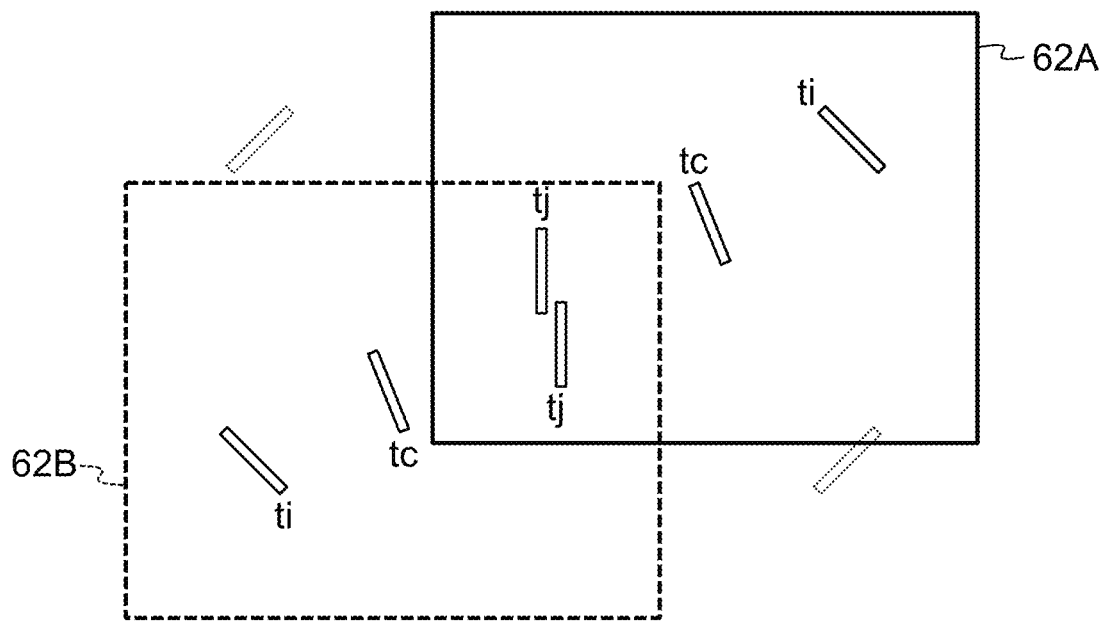
FIG. 17 is a diagram illustrating positions of claws at each clock time in Level 1 (R) and regions to determine the possibility of interference.

As illustrated in FIG. 15 and FIG. 16, at Level 0, the clock time t1 is set for clock time ti, and the clock time tn is set for clock time tj. In the example of FIG. 16, the region 62A for the robot 16A and the region 62B for the robot 16B overlap with each other, and so there is a possibility of interference. Moreover, the spacing between the claws 18 exceeds the prescribed value. In this case, as illustrated in FIG. 15 and FIG. 17, the clock time tc of Level 0 is set so as to be tj, and the interference determination processing is executed for Level 1 (R). There is also a possibility of interference in Level 1 (R) and the spacing between the claws 18 also still exceeds the prescribed value. In this case, as illustrated in FIG. 15 and FIG. 18, the clock time tc of Level 1 (R) is set so as to be tj, and the interference determination processing is executed for Level 2 (R-R).

Figure 19:
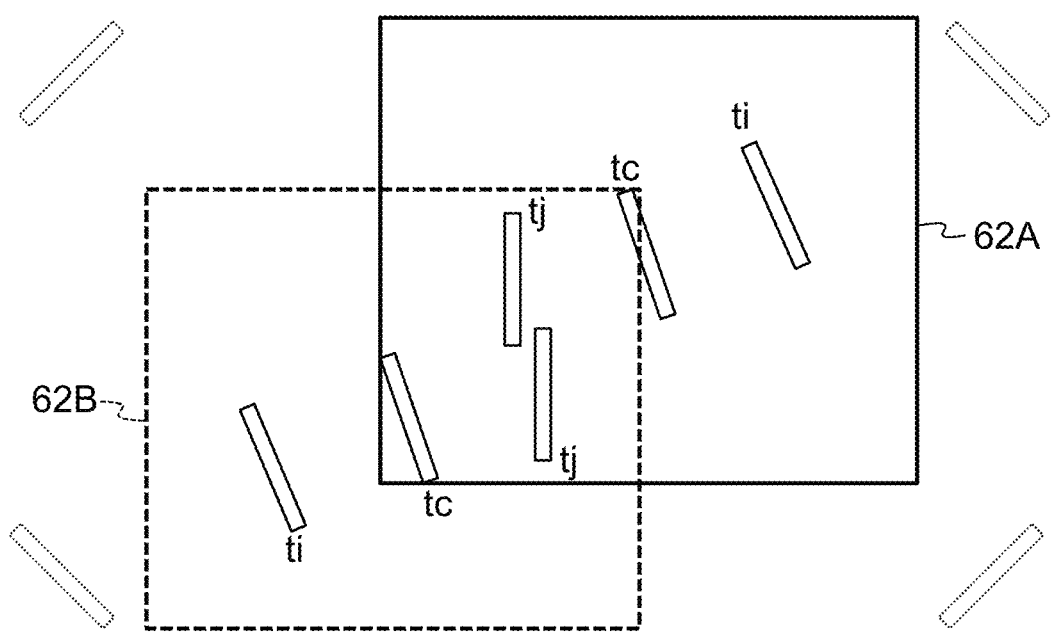
FIG. 19 is a diagram illustrating positions of claws at each clock time in Level 2 (R-L) and regions to determine the possibility of interference.

As illustrated in FIG. 15 and FIG. 18, there is determined to be no possibility of interference for Level 2 (R-R). In such cases, first a return is made to Level 1 (R), and then by transitioning to step S28, as illustrated in FIG. 15 and FIG. 19, the clock time tc of Level 1 is set so as to be ti, and the interference determination processing is executed for Level 2 (R-L). There is a possibility of interference at Level 2 (R-L) and the spacing between the claws 18 also still exceeds the prescribed value. In such cases, as illustrated in FIG. 15 and FIG. 20, the clock time tc of Level 2 (R-L) is set so as to be tj, and the interference determination processing is executed for the Level 3 (R-L-R).

Figure 20:
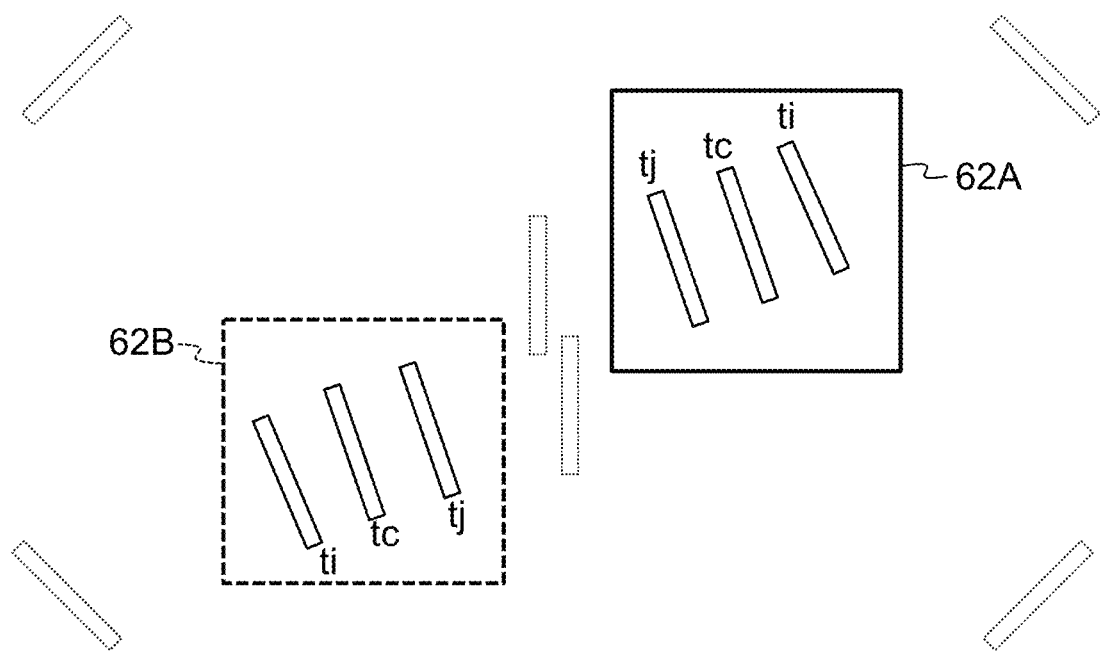
FIG. 20 is a diagram illustrating positions of claws at each clock time in Level 3 (R-L-R) and regions to determine the possibility of interference.
Figure 21:
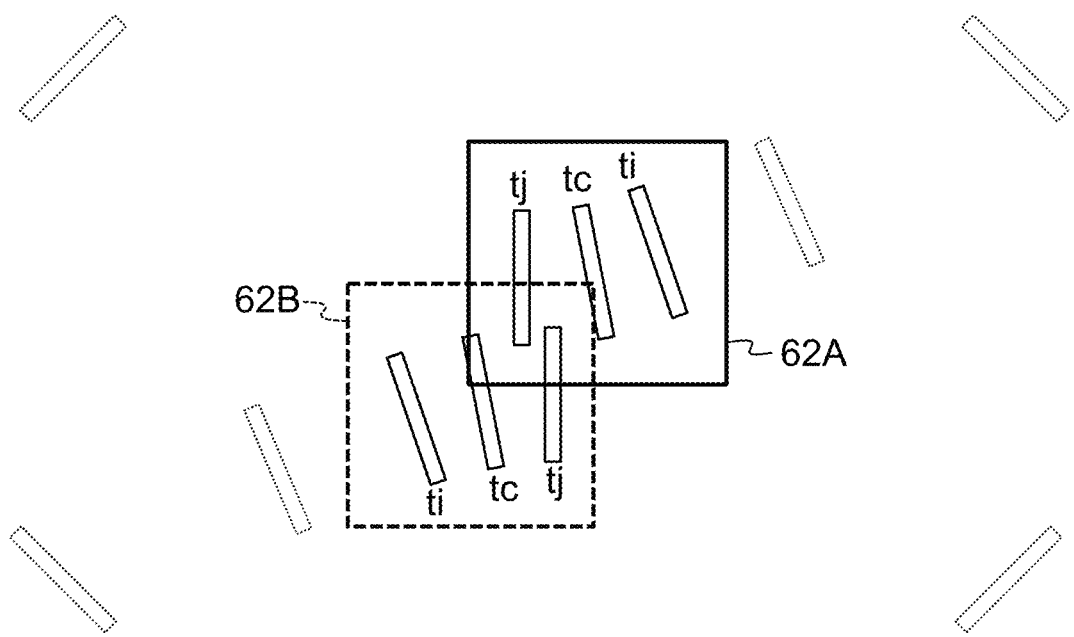
FIG. 21 is a diagram illustrating positions of claws at each clock time in Level 3 (R-L-L) and regions to determine the possibility of interference.

As illustrated in FIG. 15 and FIG. 20, determination is that there is no possibility of interference at Level 3 (R-L-R). In such cases, first a return is made to Level 2 (R-L), and then by processing transitioning to step S28, as illustrated in FIG. 15 and FIG. 21, the clock time tc of Level 2 (R-L) is set so as to be ti, and interference determination processing is executed for Level 3 (R-L-L). There is a possibility of interference at Level 3 (R-L-L) and the spacing between the claws 18 still exceeds the prescribed value. In such cases, as illustrated in FIG. 15, the clock time tc of Level 3 (R-L-L) is set so as to be tj, and the interference determination processing is executed for Level 4 (R-L-L-R).

Figure 22:
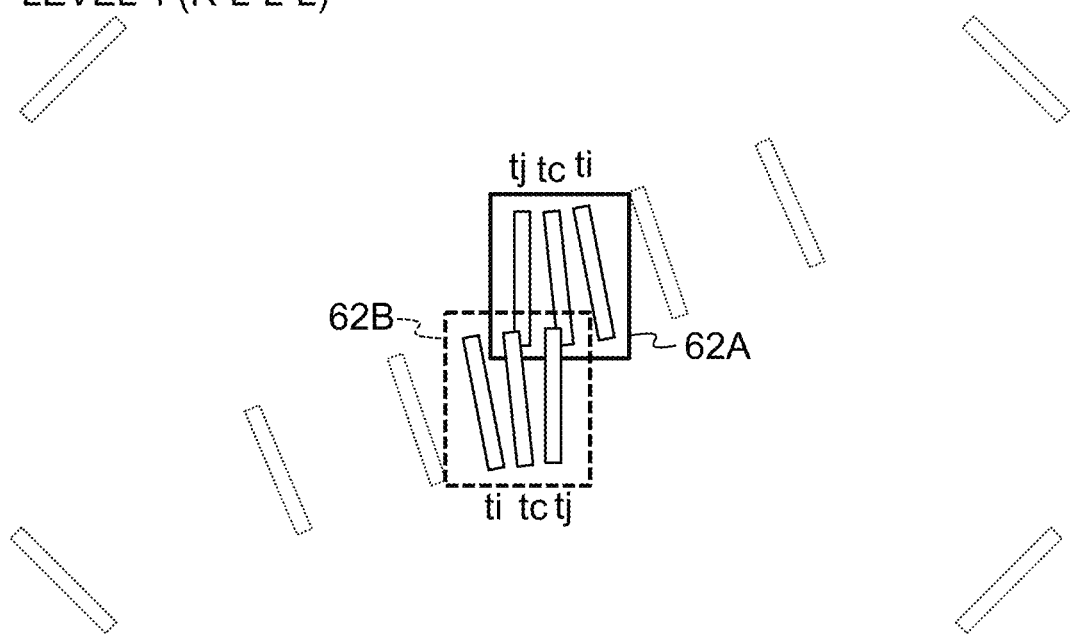
FIG. 22 is a diagram illustrating positions of claws at each clock time in Level 4 (R-L-L-L) and regions to determine the possibility of interference.

As illustrated in FIG. 15, determination is that there is no possibility of interference at Level 4 (R-L-L-R). In such cases, first a return is made to Level 3 (R-L-L), and then by processing transitioning to step S28, as illustrated in FIG. 15 and FIG. 22, the clock time tc of Level 3 (R-L-L) is set so as to be ti, and interference determination processing is executed for Level 4 (R-L-L-L). There is a possibility of interference at Level 4 (R-L-L-L) and the spacing between the claws 18 still exceeds the prescribed value. In such cases, as illustrated in FIG. 15, the clock time tc of Level 4 (R-L-L-L) is set so as to be tj, and the interference determination processing is executed for Level 5 (R-L-L-L-R).

Figure 23:
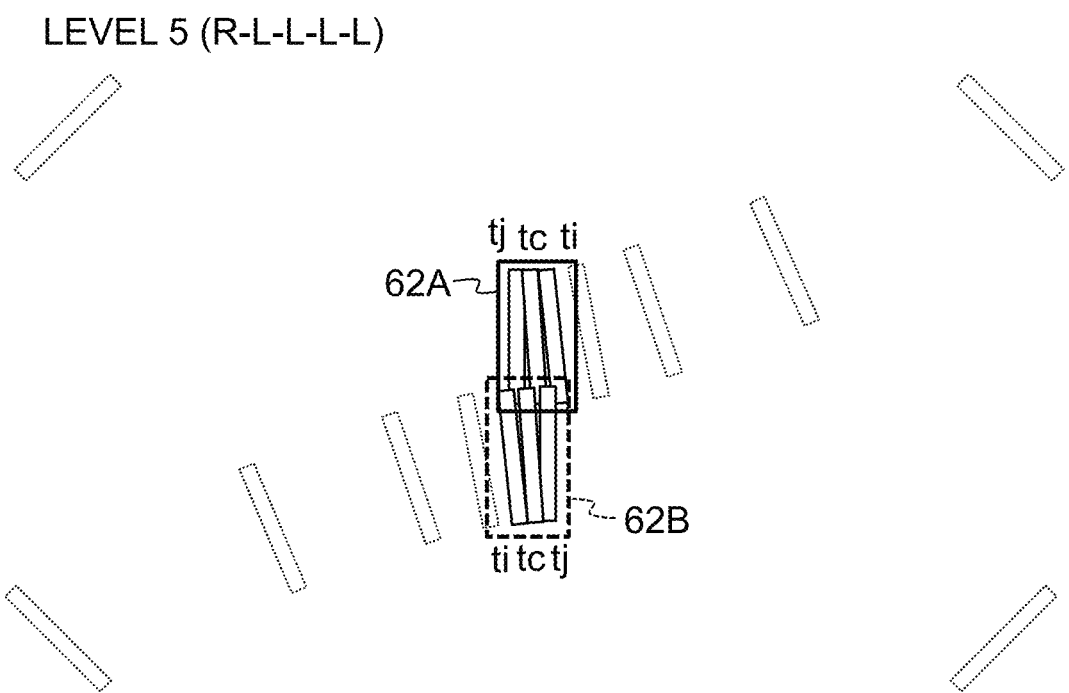
FIG. 23 is a diagram illustrating positions of claws at each clock time in Level 5 (R-L-L-L-L) and regions to determine the possibility of interference.

As illustrated in FIG. 15, determination is that there is no possibility of interference at Level 5 (R-L-L-L-R). In such cases, first a return is made to Level 4 (R-L-L-L), and by processing transitioning to step S28, as illustrated in FIG. 15 and FIG. 23, the clock time tc of Level 4 (R-L-L-L) is set so as to be ti, and interference determination processing is executed for Level 5 (R-L-L-L-L). There is a possibility of interference at Level 5 (R-L-L-L-L), but the spacing between the claws 18 is now sufficiently small. In such cases, as illustrated in FIG. 13, determination is made as to whether or not there is interference between the claws 18 of the respective robots 16 at any of the clock time ti, the clock time tc, or the clock time tj as set for Level 5 (R-L-L-L-R).

As described above, in the robot control system according to the present exemplary embodiment, the interference determination device acquires poses at clock times ti and tj for each of plural robots, and acquires structural information. Based on the structural information for each of the plural robots, the interference determination device computes positions of a prescribed part (a claw in the present exemplary embodiment) on each of the plural robots at the clock time ti, computes the positions thereof at clock time tj, and computes a midway position at a midway clock time tc. Moreover, the interference determination device determines there to be a possibility of inter-robot interference based on an overlap between added-margin regions. The added-margin regions are regions resulting from adding a prescribed margin to circumscribing shapes containing the prescribed parts for each of the plural robots at the respective positions at clock times ti, tc, and tj. In cases in which there is a possibility of interference, the interference determination device sets tc so as to be either a new ti or so as to be a new tj until spacings between the prescribed parts satisfy a condition of being sufficiently small as a predetermined condition, and then repeatedly executes the position computation and possibility of interference determination. When determined that the spacings between the prescribed parts have satisfied the condition, determination is then made as to whether or not there is interference between the respective prescribed parts on each of the plural robots at any of the positions at the clock times ti, tc, or tj. The interference determination device thereby homes-in on timings where there seems to be a possibility of interference, and performs final interference determination when in a state in which the spacings between the prescribed parts is sufficiently small. This accordingly enables the time taken for interference determination to be shortened in comparison to case in which the interference determination is performed for all of the clock times from start to end at a prescribed part spacing, when the prescribed part spacing has been determined to be sufficiently small.

Note that although an example has been explained in the above exemplary embodiment in which interference is determined between two robots, the above exemplary embodiment may be suitably applied to interference determination between three or more robots. In such cases, the added-margin regions are found for each of the three or more robots by adding a prescribed margin to the circumscribing shapes containing the prescribed parts thereof, and determining there to be a possibility of interference for case in which there is an overlap between any of these regions.

Moreover, in the present exemplary embodiment, when determining the possibility of interference, a configuration may be adopted to determine the possibility of interference between a prescribed part of the respective robots and an obstruction, based on an overlap between a region where the obstruction is present in the periphery of plural robots, and respective added-margin regions resulting from adding a prescribed margin to circumscribing shapes containing the prescribed parts. Furthermore, when the final interference determination is being performed, this may be determination as to whether there is interference between the positions of the prescribed parts and the obstruction at any of the clock times ti, tc, and tj.

Moreover, although in the above exemplary embodiment a case was described in which one midway position was set, plural midway positions may be set. For example, two midway clock times tc1 and tc2 (tc1<tc2) may be set. Similar processing, to the processing performed in the above exemplary embodiment for clock times from ti to tc and for clock times from tc to tj, may then be performed for each of the periods from clock times ti to tc1, from tc1 to tc2, and from tc2 to tj.

Moreover, although in the above exemplary embodiment a case was described in which the interference determination device and the robot control device are separate devices, an embodiment may be adopted in which the interference determination device is incorporated into the robot control device. Moreover, each of the functional configurations of the interference determination device may be implemented by a different respective device, and the interference determination processing described above may be implemented as distributed processing.

Moreover, the interference determination program executed in the above exemplary embodiment by the CPU reading and executing software (a program) may be executed by various processors other than a CPU. Examples of such processors include programmable logic devices (PLD) having circuit configurations that are modifiable after manufacture, such as field programmable gate arrays (FPGA), and dedicated electrical circuits or the like that are processors containing circuit configurations specifically designed to execute particular processing, such as an application specific integrated circuit (ASIC). Moreover, the interference determination program may be executed by a single of such various processors, or may be executed by a combination of two or more processors of the same or different type (for example, by plural FPGAs, or by a combination of a CPU and an FPGA or the like). Moreover, the hardware structure of such processors is, more specifically, electrical circuits combining circuit elements such as semiconductor elements.

Moreover, although in the above exemplary embodiment a mode has been described in which the interference determination program is pre-stored (pre-installed) on a storage device, there is no limitation thereto. The program may be provided in a format stored on a storage medium such as a CD-ROM, DVD-ROM, Blu-ray disc, USB memory, or the like. Moreover, the program may be in a format downloadable from an external device over a network.

The invention claimed is:

1. An interference determination device comprising:
   an acquisition section configured to acquire a first pose and a second pose for each of a plurality of robots, and structural information;
   a computation section that, based on structural information for each of the plurality of robots, is configured to compute, for a prescribed part of each of the plurality of robots, a first position in the first pose, a second position in the second pose, and a midway position on a trajectory between the first pose and the second pose;

a possibility determination section configured to determine a possibility of inter-robot interference in a case in which each of the plurality of robots moves from the first pose to the second pose, based on any overlap between added-margin regions resulting from addition of a prescribed margin to a circumscribed shape containing the prescribed part of each of the plurality of robots for the first positions, for the second positions, and for the midway positions;

an end determination section that, in a case in which a possibility of interference has been determined by the possibility determination section, is configured to set the midway position so as to be a new position for the first position or so as to be new position for the second position and causes processing of the computation section and the possibility determination section to be executed repeatedly until a predetermined condition is satisfied, with the predetermined condition being that a distance from the first position to the midway position and a distance from the second position to the midway position are sufficiently small distances; and an interference determination section that, in a case in which the end determination section has determined the distances to satisfy the condition, is configured to determine whether or not there is interference between the prescribed parts of the plurality of robots at any of the first positions, the second positions, or the midway positions.

2. The interference determination device of claim 1, wherein the computation section computes, as the midway position, a position on the trajectory having a distance from the first position or from the second position midway between the first position and the second position.

3. The interference determination device of claim 1, wherein the computation section computes, as the midway position, a position of the prescribed part at a midway pose between the first pose and the second pose.

4. The interference determination device of claim 1, wherein the computation section computes, as a midway pose, a pose of a robot at a midway clock time between a clock time of the first pose and a clock time of the second pose, and computes, as the midway position, a position of the prescribed part in the midway pose.

5. The interference determination device of claim 1, wherein the possibility determination section determines the margin as a longer distance from among the distance from the first position to the midway position or the distance from the second position to the midway position.

6. The interference determination device of claim 1, wherein the possibility determination section determines the margin based on a predetermined relationship between an amount of change in pose of a robot and an amount of change of position of the prescribed part.

7. The interference determination device of claim 1, wherein the possibility determination section takes, as the circumscribed shape, a bounding sphere, an axis aligned bounding box, an oriented bounding box, or a convex hull.

8. The interference determination device of claim 1, wherein the end determination section determines the condition to be satisfied in a case in which the distance is not more than a prescribed value.

9. The interference determination device of claim 8, wherein the end determination section sets the prescribed value to a larger value as an inter-robot distance between the prescribed parts increases.

10. The interference determination device of claim 1, wherein:

the possibility determination section is configured to determine a possibility of interference between the prescribed part and an obstruction in a case in which the plurality of robots move from the first pose to the second pose, based on any overlap between a region where the obstruction is present at a periphery of the plurality of robots and the added-margin regions resulting from addition of a prescribed margin to a circumscribed shape containing the prescribed part; and in a case in which the end determination section has determined the distance to satisfy the condition, the interference determination section determines interference with the obstruction at each of the first position, the second position, and the midway position.

11. An interference determination method comprising:

an acquisition section acquiring a first pose and a second pose for each of a plurality of robots, and structural information;

a computation section computing, based on structural information for each of the plurality of robots, for a prescribed part of each of the plurality of robots, a first position in the first pose, a second position in the second pose, and a midway position on a trajectory between the first pose and the second pose;

a possibility determination section determining a possibility of inter-robot interference in a case in which each of the plurality of robots moves from the first pose to the second pose, based on any overlap between added-margin regions resulting from addition of a prescribed margin to a circumscribed shape containing the prescribed part of each of the plurality of robots at any of the first positions, the second positions, and the midway positions;

an end determination section setting the midway position so as to be a new position for the first position or so as to be new position for the second position in a case in which a possibility of interference has been determined by the possibility determination section, the end determination section causing processing of the computation section and the possibility determination section to be executed repeatedly until a predetermined condition is satisfied, with the predetermined condition being that a distance from the first position to the midway position and a distance from the second position to the midway position are sufficiently small distances; and an interference determination section determining whether or not there is interference between the prescribed parts of the plurality of robots at any of the first positions, the second positions, or the midway positions in a case in which the end determination section has determined the distances to satisfy the condition.

12. A non-transitory storage medium storing an interference determination program executable by a computer to function as:

an acquisition section configured to acquire a first pose and a second pose for each of a plurality of robots, and structural information;

a computation section that, based on structural information for each of the plurality of robots, is configured to compute, for a prescribed part of each of the plurality of robots, a first position in the first pose, a second position in the second pose, and a midway position on a trajectory between the first pose and the second pose;

a possibility determination section configured to determine a possibility of inter-robot interference in a case in which each of the plurality of robots moves from the first pose to the second pose, based on any overlap between added-margin regions resulting from addition of a prescribed margin to a circumscribed shape containing the prescribed part of each of the plurality of robots for the first positions, for the second positions, and for the midway positions;

an end determination section that, in a case in which a possibility of interference has been determined by the possibility determination section, is configured to set the midway position so as to be a new position for the first position or so as to be new position for the second position and causes processing of the computation section and the possibility determination section to be executed repeatedly until a predetermined condition is satisfied, with the predetermined condition being that a distance from the first position to the midway position and a distance from the second position to the midway position are sufficiently small distances; and an interference determination section that, in a case in which the end determination section has determined the distances to satisfy the condition, is configured to determine whether or not there is interference between the prescribed parts of the plurality of robots at any of the first positions, the second positions, or the midway positions.

* * * * *